US008455072B2

(12) United States Patent
De Palo et al.

(10) Patent No.: US 8,455,072 B2
(45) Date of Patent: Jun. 4, 2013

(54) POLYOLEFIN COMPOSITION FOR PIPE SYSTEM AND SHEETS

(75) Inventors: Roberto De Palo, Ferrara (IT); Roberta Marzolla, Occhiobello (IT)

(73) Assignee: Basell Poliolefine Italia S.r.l., Milan (IT)

( * ) Notice: Subject to any disclaimer, the term of this patent is extended or adjusted under 35 U.S.C. 154(b) by 623 days.

(21) Appl. No.: 12/448,378

(22) PCT Filed: Dec. 11, 2007

(86) PCT No.: PCT/EP2007/063728
§ 371 (c)(1),
(2), (4) Date: Jun. 18, 2009

(87) PCT Pub. No.: WO2008/077773
PCT Pub. Date: Jul. 3, 2008

(65) Prior Publication Data
US 2010/0021666 A1    Jan. 28, 2010

Related U.S. Application Data

(60) Provisional application No. 60/876,736, filed on Dec. 22, 2006.

(30) Foreign Application Priority Data

Dec. 22, 2006   (EP) .................................... 06127022

(51) Int. Cl.
*B32B 1/08*   (2006.01)
*C08L 9/00*   (2006.01)
*C08L 23/12*   (2006.01)

(52) U.S. Cl.
USPC .................... 428/36.92; 428/36.9; 428/36.91; 525/232; 525/240

(58) Field of Classification Search
USPC .................. 428/36.9, 36.91, 36.92; 525/232, 525/240
See application file for complete search history.

(56) References Cited

U.S. PATENT DOCUMENTS

| | | | |
|---|---|---|---|
| 4,399,054 A | 8/1983 | Ferraris et al. | |
| 5,095,153 A | 3/1992 | Agnes et al. | |
| 5,221,651 A | 6/1993 | Sacchetti et al. | |
| 5,698,642 A | 12/1997 | Govoni et al. | |
| 6,031,055 A * | 2/2000 | Auburn et al. | 526/127 |
| 6,172,172 B1 | 1/2001 | Burgin et al. | |
| 6,413,477 B1 | 7/2002 | Govoni et al. | |
| 6,632,885 B2 | 10/2003 | Morizono et al. | |
| 6,818,583 B1 | 11/2004 | Morini et al. | |
| 7,022,640 B2 | 4/2006 | Morini et al. | |
| 7,049,377 B1 | 5/2006 | Morini et al. | |
| 7,572,860 B2 | 8/2009 | De Palo et al. | |
| 7,595,103 B2 | 9/2009 | De Palo et al. | |
| 2003/0049477 A1 | 3/2003 | Morizono et al. | |
| 2007/0196608 A1 | 8/2007 | De Palo et al. | |
| 2009/0030098 A1 | 1/2009 | Cagnani et al. | |

FOREIGN PATENT DOCUMENTS

| | | |
|---|---|---|
| EP | 45977 | 2/1982 |
| EP | 361493 | 4/1990 |
| EP | 395083 | 10/1990 |
| EP | 728769 | 8/1996 |
| EP | 782587 | 7/1997 |
| WO | 00/63261 | 10/2000 |
| WO | 03/037981 | 5/2003 |
| WO | 2005/014713 | 2/2005 |
| WO | 2006/002778 | 1/2006 |
| WO | 2006/114358 | 11/2006 |
| WO | 2007/003523 | 1/2007 |

* cited by examiner

Primary Examiner — Erik Kashnikow

(57) ABSTRACT

A polyolefin composition, and pipe systems and sheets made therefrom, the composition comprising (percent by weight), 1) 10-60% of a copolymer of propylene and hexene-1 comprising from 0.2 to 10% of recurring units derived from hexene-1; 2) 10-85% of a propylene polymer selected from propylene homopolymer and a polymer of propylene with 0.1-10% of an α-olefin selected from ethylene, a $C_4$-$C_{10}$ α-olefin, hexene-1 excluded, and a mixture thereof, the propylene polymer being insoluble in xylene at ambient temperature in an amount over 85% and having a Polydispersity Index ranging from 4.5 to 12; and 3) 5-30% of a copolymer of ethylene with a $C_3$-$C_{10}$ α-olefin and optionally a diene, having an ethylene content ranging from 15 to 60% and an intrinsic viscosity value of at least 1 dl/g.

7 Claims, No Drawings

POLYOLEFIN COMPOSITION FOR PIPE SYSTEM AND SHEETS

This application is the U.S. national phase of International Application PCT/EP2007/063728, filed Dec. 11, 2007, claiming priority to European Application 06127022.9 filed Dec. 22, 2006 and the benefit under 35 U.S.C. 119(e) of U.S. Provisional Application No. 60/876,736, filed Dec. 22, 2006; the disclosures of International Application PCT/EP2007/063728, European Application 06127022.9 and U.S. Provisional Application No. 60/876,736, each as filed, are incorporated herein by reference.

The present invention relates to a polyolefin composition suitable to produce pipe systems and sheets.

Pipes, tubing and fittings are intended within the term of pipe systems.

The term sheets includes sheets for thermoforming and plates to be used iii the preparation of semi-finished products such as those employed in chemical industry.

The sheets or plates are mainly being used in the production of articles such as containers for housewares and food, for example juice containers, yogurt cups, margarine tubs and others. Said sheets or plates can also be used in the production of automotive parts.

The pipe systems according to the present invention are particularly suitable to transport, outdoor and indoor, fluids under high pressure and/or gravity sewerage and their handling during installation is very easy.

In pressure pipe applications polypropylene is appreciated in hot and cold water distribution systems inside and outside buildings and/or when high chemical resistance is required.

Pipes wherein the polypropylene plastic material is used in place of the currently used plastic materials are not usually used till now, due to an insufficient balance of mechanical properties, in particular insufficient balance between burst pressure resistance and impact resistance of the polypropylene material, especially at low temperature.

Patent application WO 2006/002778 discloses mono or multilayer pipe systems having at least one layer comprising a semi-crystalline copolymer of propylene and hexene-1 and, optionally, a further recurring unit derived from the olefins selected from ethylene and a $C_4$-$C_{10}$ α-olefin, wherein said copolymer contains from 0.2 to 5 wt %, preferably 0.5 to 5 wt % of recurring units derived from hexene-1. Pipe systems according to the above mentioned invention show a very high burst pressure resistance which provides pipes with high durability. The drawback related to said systems is low impact resistance expressed by the low values of IZOD test, particularly at low temperatures. This aspect is critical because this property is associated with workability and handling of the pipes during installation. Pipes based on materials having low impact resistance values become not workable and their handling is difficult when the temperature is lower than 10° C., that is very common during the cold seasons in most of the countries.

Patent application WO 2005/014713 discloses a heterophasic polypropylene composition suitable for non-pressure pipe applications, such as waste water pipes, for both indoor use and, preferably, outdoor use. Said composition provides pipe systems with good impact properties. However, we have found that pipe systems made from said composition have very low values of burst pressure resistance, therefore said composition can not be used for pipe systems transporting fluids under high pressure for a long time. It is an object of the present invention to provide polyolefin pipe systems with an optimal balance between resistance properties, in particular good impact resistance at low temperature, without decreasing stiffness, and good burst pressure resistance. It is a further object of the present invention to provide pipe systems with an improved durability, workability and handling. In particular, pipe systems according to the present invention can specifically be used for indoor and outdoor pipes installation in cold clime regions.

The polymeric composition of the present invention comprises (percent by weight):

1) 10-60% of a copolymer of propylene and hexene-1 wherein said copolymer comprises from 0.2 to 10% of recurring units derived from hexene-1, preferably from 0.5 to 8%, more preferably ranging from 1 to 6%; and
2) 10-85% of a propylene polymer selected from propylene homopolymer and a polymer of propylene with 0.1-10% of a α-olefin selected from ethylene, a $C_4$-$C_{10}$ α-olefin, hexene-1 excluded, and a mixture thereof, said propylene polymer being insoluble in xylene at ambient temperature in an amount over 85% and having a Polydispersity Index ranging from 3 to 20; and
3) 5-30% of a copolymer of ethylene with a $C_3$-$C_{10}$ α-olefin and optionally a diene, having an ethylene content ranging from 15 to 60% and an intrinsic viscosity value of at least 1 g/ml.

The percentages of (1), (2) and (3) are referred to the sum of (1), (2) and (3).

Said polymeric composition shows a Melt Index from 0.05 to 10 dg/min, preferably from 0.1 to 3 dg/min, according to ISO method 1133.

Said polymeric composition and the articles derived therefrom have an optimal balance of mechanical properties; they show a Flexural Modulus higher than 1000 MPa, preferably higher than 1200 MPa, IZOD Impact Resistance at −20° C. ranging between 5 and 20 KJ/m² and Burst Pressure Resistance higher than 1000 hours, preferably higher than 3000 hours, more preferably ranging between 4000 and 40000 hours.

The component (1) may exhibit broad molecular weight distribution, in terms of the ratio of weight average molecular weight to numeric average molecular weight ($\overline{M}_w/\overline{M}_n$), ranging from 5 to 15 and also molecular weight distribution of monomodal or bimodal type, preferably of monomodal type.

By "molecular weight distribution of monomodal type" is meant that the molecular weight distribution curve obtained by GPC has a single maximum value. By "molecular weight distribution of bimodal type" is meant that the molecular weight distribution curve obtained by GPC has more than one maximum value, or a single maximum value and one or more inflexion points.

The distribution of hexene-1 in and among the polymer chains may vary. In particular it may be that its content is higher in the polymer chains having high molecular weight with respect to its content in lower molecular weight chains.

However, said propylene-hexene-1 copolymer preferably exhibits hexene-1 content, in the fraction with an intrinsic viscosity of equal to or higher than 3.3 dl/g, lower than the hexene-1 content in the fraction with an intrinsic viscosity lower than 3.3 dl/g. For example, the copolymer exhibits a hexene-1 content of 1.5 wt % or less in the fraction with an intrinsic viscosity equal to or higher than 3.3 dl/g, and a hexene-1 content higher than 1.5 wt % in the fraction with an intrinsic viscosity lower than 3.3 dl/g. More typically, the hexene-1 content in the fraction with an intrinsic viscosity lower than 3.3 dl/g ranges from 1.5 to 6 wt % and the hexene-1 content in the fraction with an intrinsic viscosity equal to or higher than 3.3 dl/g ranges from 0.1 to 1.5 wt %, provided that the total hexene-1 content in the copolymer ranges from 0.2 to 10 wt %.

The fractionation of the polymer was carried out by Solvent Gradient Elution Fractionation under the conditions indicated herein below; the intrinsic viscosity is determined as described below.

The Solvent Gradient Elution Fractionation was carried out by dissolving about 2 g of the polymer for 1 hour at 145° C. in 180 ml of a mixture of a solvent/non-solvent pair: tetralin/carbitol. The polymer solution, stabilized with 0.1 g/L of Irganox 1010, was then loaded into a column packed with glass beads and cooled down gradually from 145° C. to 26° C. In this step the polymer precipitated out of the solution and deposited onto the column packing materials. The first fraction was obtained at 26° C. whereas the other fractions were collected after having raised the column temperature to 145° C. and by varying the composition of the eluting mixture in such a way to increase its dissolution power (increasing of the mixture solvent/non-solvent ratio). The polymer fractions were obtained by precipitation with acetone, recovered by filtration on a 0.5-μm stainless-steel filter, dried under vacuum at about 70° C., and finally, weighted.

The intrinsic Viscosity was determined in tetrahydronaphthalene at 135° C.

The values of Polydispersity Index (P.I.) approximately can range from 3 to 10.

For Polydispersity Index is intended the rheological measurement of the Molecular Weight Distribution determined as described below.

The propylene-hexene-1 copolymers used in the present invention have a stereoregularity of isotactic type of the propylenic sequences shown by high value of xylene insolubility.

When present, the third comonomer is an olefin selected from ethylene and a linear or branched $CH_2=CHR$ α-olefins, hexene-1 excluded, wherein R is an alkyl radical with from 2 to 6 carbon atoms. Preferred olefins are ethylene and butene-1. The amount of the third olefin monomer can range from more than 0 to 9% by moles, preferably from 0.5 to 9% by moles, more preferably 1 to 7% by moles.

The propylene-hexene-1 copolymers are preferably selected from copolymers of propylene and hexene-1 and terpolymers of propylene, hexene-1 and ethylene.

Typically, said propylene-hexene-1 copolymers also exhibit at least one of the following features:
- a melting temperature equal to or higher than 135° C., preferably equal to or higher than 140° C., such as from 140 to 155° C.; and
- a solubility in xylene at ambient temperature (i.e. about 25° C.) lower than 12 wt %, preferably lower than 9 wt % with respect to the total weight of the propylene-hexene-1 copolymer.

The above mentioned copolymers typically have a Melt Index of 0.01 to 2.5 dg/min, preferably from 0.01 to 1 dg/min according to ISO method 1133.

The propylene-hexene-1 copolymers used in the present invention generally have a low amount of the polymer fraction soluble in hexane measured according to the method FDA 177, 1520. Typically, the amount of said hexane-soluble fraction is 5.5% by weight or less, preferably 4% by weight or less.

The propylene-hexene-1 copolymers used in the present invention can be prepared by a polymerization in one or more polymerization steps. Such polymerization can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used for producing the propylene-hexene-1 copolymers of the invention are capable to provide polypropylene with a value of xylene insolubility at ambient temperature greater than 90%, preferably greater than 95%. Catalysts having the above mentioned characteristics are well known in the patent literature; particularly advantageous are the solid catalyst components used in the catalysts described in U.S. Pat. No. 4,399,054, European patents Nos. 45977 and 395083.

The solid catalyst components used in said catalysts comprise, as electron-donor compounds (internal electron-donor compounds), compounds selected from the group consisting of ethers, ketones, lactones, compounds containing N, P and/or S atoms, and esters of mono-and dicarboxylic acids. Particularly suitable electron-donor compounds are phthalic acid esters, such as diisobutyl, dioctyl, diphenyl and benzylbutyl phthalate, and esters of succinic acids. Among phthalic acid esters the diisobutyl phthalate is particularly preferred.

Particularly suitable internal electron donor compounds are selected from succinates disclosed in international patent application WO00/63261. Preferably, succinates have formula (I) below:

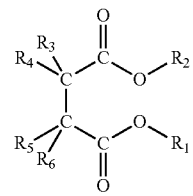

wherein $R_1$ and $R_2$ radicals, equal to, or different from, each other are a $C_1$-$C_{20}$ linear or branched alkyl, alkenyl, cycloalkyl, aryl, arylalkyl or alkylaryl radical group, optionally containing heteroatoms; the $R_3$ to $R_6$ radicals equal to, or different from, each other, are hydrogen or a $C_1$-$C_{20}$ linear or branched alkyl, alkenyl, cycloalkyl, aryl, arylalkyl or alkylaryl radical group, optionally containing heteroatoms, and the $R_3$ to $R_6$ radicals which are joined to the same carbon atom can be linked together to form a cycle; with the proviso that when $R_3$ to $R_5$ radicals are contemporaneously hydrogen, $R_6$ is a radical selected from primary branched, secondary or tertiary alkyl, cycloalkyl, aryl, arylalkyl or alkylaryl radical groups having from 3 to 20 carbon atoms, or a linear alkyl radical group having at least four carbon atoms optionally containing heteroatoms.

Other electron-donors particularly suitable are 1,3-diethers of formula:

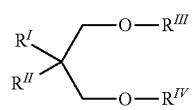

Wherein $R^I$ and $R^{II}$ radicals are the same or different and are $C_1$-$C_{18}$ alkyl, $C_3$-$C_{18}$ cycloalkyl or $C_7$-$C_{18}$ aryl radicals; $R^{III}$ and $R^{IV}$ radicals are the same or different and are $C_1$-$C_4$ alkyl radicals; or are 1,3-diethers in which the carbon atom in position 2 belongs to a cyclic or polycyclic structure made up of 5, 6 or 7 carbon atoms and containing two or three unsaturations.

Ethers of this type are described in published European patent applications Nos 361493 and 728769.

Representative examples of said diethers are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl)fluorene.

The preparation of the above mentioned catalyst components is carried out according to various methods. For example, a $MgCl_2.nROH$ adduct (in particular in the form of spherical particles) wherein n is generally from 1 to 6 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound. The Al-alkyl compounds used as co-catalysts comprise the Al-trialkyls, such as Altriethyl, Al-triisobutyl, Al-tributyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio is from 1 to 1000.

The electron-donor compounds that can be used as external donors include aromatic acid esters such as alkyl benzoates and in particular silicon compounds containing at least one Si—OR bond, where R is a hydrocarbon radical. Examples of preferred silicon compounds are $(tertbutyl)_2Si(OCH_3)_2$, $(cyclopentyl)_2Si(OCH_3)_2$, $(cyclohexyl)(methyl)Si(OCH_3)_2$ and $(isopropyl)_2Si(OCH_3)_2$.

Prior to the polymerization process, the catalysts can be precontacted with small quantities of olefins (prepolymerization), thus improving the performance of the catalysts and the morphology of the polymers prepolymerization is carried out maintaining the catalysts in suspension in a hydrocarbon solvent (hexane or heptane, for example) and polymerizing at a temperature from ambient to 60° C. for sufficient time to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component. In particular, even if many other combinations of the previously said catalyst components may allow to obtain propylene-hexene-1 copolymer compositions according to the present invention, the copolymers are preferably prepared by using catalysts containing a phthalate as inside donor and $(cyclopentyl)_2Si(OCH_3)_2$ as outside donor.

Said propylene-hexene-1 copolymers are typically produced by a well-known polymerization process, such as in liquid (bulk or slurry) or in gas phase. According to the preferred polymerization process such copolymers are produced by a gas-phase polymerization process carried out in at least two interconnected polymerization zones.

The process according to the preferred process is illustrated in EP application 782 587.

In detail, said process comprises feeding the monomers to said polymerization zones in the presence of catalyst under reaction conditions and collecting the polymer product from said polymerization zones. In said process the growing polymer particles flow upward through one (first) of said polymerization zones (riser) under fast fluidization conditions, leave the riser and enter another (second) polymerization zone (downcomer) through which they flow downward in a densified form under the action of gravity, leave the downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

Generally, the condition of fast fluidization in the riser is established by feeding a gas mixture comprising the relevant monomers to said riser. It is preferable that the feeding of the gas mixture is effected below the point of reintroduction of the polymer into said riser by the use, where appropriate, of gas distributor means. The velocity of gas transport into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The polymer circulating between the two polymerization zones can be controlled by dosing the amount of polymer leaving the downcomer using means suitable for controlling the flow of solids, such as mechanical valves.

The operating parameters, such as the temperature, are those that are usual in olefin polymerization process, for example between 50 to 120° C.

This first stage process can be carried out under operating pressures of between 0.5 and 10 MPa, preferably between 1.5 to 6 MPa.

Advantageously, one or more inert gases are maintained in the polymerization zones, in such quantities that the sum of the partial pressure of the inert gases is preferably between 5 and 80% of the total pressure of the gases. The inert gas can be nitrogen or propane, for example.

The various catalysts are fed into the riser at any point of said riser. However, they can also be fed at any point of the downcomer.

The propylene polymer (2) of the polymeric composition of the present invention is selected from propylene homopolymer and a polymer of propylene with 0.1-10% of an α-olefin selected from ethylene, a $C_4$-$C_{10}$ α-olefin, hexene-1 excluded, and a mixture thereof, said propylene polymer being insoluble in xylene at ambient temperature in an amount over 85% and having a Polydispersity Index ranging from 3 to 20, preferably from 4.5 to 12, more preferably from 5 to 9, and preferably an intrinsic viscosity value higher than 2 dl/g, preferably from 2.2 to 4.5 dl/g.

The stereoregularity of said propylene polymers (2) is preferably of the isotactic type, as shown by high values of xylene insolubility. In particular, the propylene polymers (2) are preferably insoluble in xylene at ambient temperature in an amount over 90 wt %, more preferably over 95 wt %.

When the propylene polymer (2) is a copolymer of propylene with a $C_4$-$C_{10}$ α-olefin, typically the $C_4$-$C_{10}$ α-olefin content ranges from 0.1 to less than 2 wt %. When the propylene polymer (2) is a terpolymer of propylene with ethylene and $C_4$-$C_{10}$ α-olefin, typically the ethylene and $C_4$-$C_{10}$ α-olefin content ranges from 0.5 to less than 2 wt %.

When the comonomer in the polymer (2) is a $C_4$-$C_{10}$ α-olefin, it is linear or branched and is preferably selected from butene-1, pentene-1,4-methylpentene-1 and octene-1, or combinations thereof.

The propylene polymer (2) can be obtained by polymerizing the monomers in the presence of Ziegler-Natta catalysts as described above for the component (1).

The ethylene copolymer (3) can comprise a diene, conjugated or not, such as butadiene, 1,4-hexadiene, 1,5-hexadiene and ethylidene-norbornene-1. The diene, when present, is typically in an amount of from 0.5 to 10 wt % with respect to the total weight of the ethylene copolymer (3).

The ethylene copolymer (3) typically has an ethylene content ranging from 20 to 60 wt %, preferably from 35 to 55 wt %, preferably an intrinsic viscosity value higher than 1.4 dl/g and more preferably ranging from 2 to 5 dl/g.

Said ethylene copolymer (3) can be obtained by polymerizing the monomers in the presence of Ziegler-Natta catalysts as described above for the components (1) and (2).

The polymeric composition of the present invention can be obtained by blending the components (1), (2) and (3) or by a sequential polymerization process. In the sequential polymerization process the order of the polymerization stages is not a critical process feature, however it is preferred to prepare polymers with higher xylene insolubility, such as components (1) and (2), before preparing the ethylene copolymer (3).

According to a preferred embodiment the composition of the present invention can be obtained by combining the component (1) with the heterophasic composition (B) to form the following preferred composition comprising (percent by weight):
A) 10-60% of a copolymer of propylene and hexene-1 wherein said copolymer comprises from 0.2 to 10% of recurring units derived from hexene-1, preferably from 0.5 to 8%, more preferably ranging from 1 to 6%; and
B) 40-90% of a heterophasic polypropylene comprising:
   B1) 65-95% of a propylene polymer selected from propylene homopolymer and a polymer of propylene with 0.1-10% of an α-olefin selected from ethylene, a $C_4$-$C_{10}$ α-olefin and a mixture thereof, said propylene polymer being insoluble in xylene at ambient temperature in an amount over 85% and having a Polydispersity Index ranging from 3 to 20.
   B2) 5-35% of a copolymer of ethylene with a $C_3$-$C_{10}$ α-olefin and optionally a diene, having an ethylene content ranging from 15 to 60% and an intrinsic viscosity value of at least 1 g/ml.

In said preferred composition the component (A) is the same as the component (1) described above.

Said heterophasic polyolefin composition (B) has generally a MFR value ranging from 0.01 to 100 g/10 min, and is characterized by a ratio of the intrinsic viscosity value of propylene polymer (B1) to that of ethylene copolymer (B2) ranging from 0.45 to 1.6. Said heterophasic polyolefin composition (B) can be prepared in accordance with well-known polymerization processes.

The process for preparing the heterophasic polyolefin composition (B) is carried out by a sequential polymerization comprising at least two sequential steps, wherein components (B1) and (B2) are prepared in separate subsequent steps, operating in each step, except the first step, in the presence of the polymer formed and the catalyst used in the preceding step. Preferably, the catalyst is added only in the first step, however its activity is such that it is still active for all the subsequent steps. Component (B1) is preferably prepared in a single polymerization stage.

The order of the polymerization stages is not a critical process feature; however component (B1) is preferably prepared before component (B2). The polymerization can occur in liquid phase, gas phase or liquid-gas phase. For example, it is possible to carry out the propylene polymerization stage using liquid propylene as diluent, and the following copolymerization stage in gas phase, without intermediate stages except for the partial degassing of the propylene. Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerization in a cascade of stirred gas-phase reactors that are connected in series and in which the pulverulent reaction bed is kept in motion by means of a vertical stirrer. The reaction bed generally comprises the polymer that is polymerised in the respective reactor.

Propylene polymerization to form component (B1), which has the same features as those of the component (2), can be done in the presence of ethylene and/or one or more $C_4$-$C_{10}$ α-olefin(s), such as for example butene-1, pentene-1,4-methylpentene-1 and octene-1, or a combination thereof.

As previously said, the copolymerisation of ethylene with propylene and/or other $C_4$-$C_{10}$ α-olefin(s) to form component (B2), which has the same features as those of the component (3), can occur in the presence of an above mentioned diene. Reaction time, pressure and temperature relative to the polymerization steps are not critical, however it is better if the temperature is from 20 to 150° C., in particular from 50 to 100° C. The pressure can be atmospheric or higher.

The regulation of the molecular weight is carried out by using known regulators, hydrogen in particular.

Alternatively, the heterophasic polyolefin composition (B) can be produced by the gas-phase polymerization process carried out in at least two interconnected polymerisation zones and described in detail above.

The polymeric composition of the invention can further comprise an inorganic filler agent in an amount ranging from 0.5 to 60 parts by weight with respect to 100 parts by weight of said polymeric composition. Few examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

Pipe systems and sheets according to the present invention may be single layer or multilayer, wherein the layers can have the same or different thickness. Typically the thickness of the sheets may vary between 0.25 mm and 10 mm, preferably between 0.3 mm and 7 mm. In multilayer pipes, all the layers can be made from the same polyolefin composition. Otherwise, at least one layer is made from the polyolefin composition described above and the further layer(s) are made from amorphous or crystalline polymers of R—CH═$CH_2$, where R radical is a hydrogen or a $C_1$-$C_6$ alkyl radical, or their mixtures, or fluorinated polymers, such as polyvinyl difluoride. Examples of said polymers are isotactic or mainly isotactic propylene homopolymers, polyethylene, polyolefin copolymers or further heterophasic polyolefin compositions.

Pipe systems and sheets according to the invention are produced in manner known per se, such as by extrusion or injection moulding of the polyolefin composition. Multilayer pipes are produced by coextrusion or other methods as well.

Extrusion of articles can be made with different type of extruders for polyolefin, e.g. single or twin screw extruders.

The following examples are given to illustrate the present invention without limiting purpose.

The data relating to the pipe systems and sheets of the examples are determined by way of the methods reported below. Results of the tests are shown in Table 1.

Xylene Soluble Fraction: Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Polydispersity Index: Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I. = 10^5/G_c$$

in which $G_c$ is the crossover modulus defined as the value (expressed in Pa) at which $G'=G''$ wherein $G'$ is the storage modulus and $G''$ is the loss modulus.

Melt Flow Rate (MFR): According to ISO method 1133 (5 Kg, 230° C.)

Content of 1-hexene: Determined by I.R. spectroscopy

Content of ethylene: Determined by I.R. spectroscopy

Burst Pressure Resistance: According to ISO method 1167, tests were carried out at temperature of 95° C. and under a circumferential stress of 3.5 MPa.

Flexural elastic modulus: According to ISO method 178.

IZOD impact resistance, notched: According to ISO method 180/1A.

EXAMPLE 1

Pipes were obtained by extruding a composition comprising 20% by weight of component (A) and 80% by weight of component (B). Said extruded pipes had an outer diameter of 32 mm and a wall thickness of 5 mm.

The component (A) was prepared according to the process disclosed in the patent application No. WO 2006/002778, which component (A) is a copolymer of propylene and hexene-1 having a content of hexene-1 equal to 2% by weight with respect to the total amount of copolymer, a Polydispersity Index of 4.4 and a Xylene Soluble Fraction of 3% by weight.

The component (B) is a heterophasic copolymer having a total ethylene content of 7.5% and a MFR value of 1.3 g/10 min, prepared by polymerizing propylene and ethylene with a Ziegler-Natta catalyst in a series of three reactors equipped with devices to transfer the product from one reactor to the next one. The first two reactors were liquid phase reactors, and the third was a fluid bed gas reactor. Said heterophasic component (B) containing 85% of propylene homopolymer (B1) having a xylene insolubility over 85% and 15% of the ethylene-propylene copolymer (B2) having an intrinsic viscosity value of 3.5 dl/g.

COMPARATIVE EXAMPLE 2

Pipes made entirely from component (A), with an outer diameter of 32 mm and a wall thickness of 5 mm, were extruded and tested.

COMPARATIVE EXAMPLE 3

Pipes made entirely from component (B), with an outer diameter of 32 mm and a wall thickness of 5 mm, were extruded and tested.

TABLE 1

| | Example | | |
|---|---|---|---|
| | Ex. 1 | Comp. Ex. 2 | Comp. Ex. 3 |
| Flexural Modulus [MPa] | 1427 | 1120 | 1400 |
| IZOD Impact Resistance at 23° C. [KJ/m²] | 87 | 8.2 | 60 |
| IZOD Impact Resistance at 0° C. [KJ/m²] | 18 | 4.3 | 24 |
| IZOD Impact Resistance at −20° C. [KJ/m²] | 7.09 | 2.8 | 12 |
| Burst Pressure Resistance [hours] at 95° C./3.5 MPa | 5653 | 17000 | 374 |

The invention claimed is:

1. A polyolefin composition comprising (percent by weight):
    1) 10-60% of a copolymer of propylene and hexene-1 wherein said copolymer comprises from 0.2 to 10% of recurring units derived from hexene-1, having a Polydispersity Index of 3 to 10;
    2) 10-85% of a propylene polymer selected from a propylene homopolymer and a polymer of propylene with 0.1-10% of an α-olefin selected from ethylene, a $C_4$-$C_{10}$ a-olefin, hexene-1 excluded, and a mixture thereof, said propylene polymer being insoluble in xylene at ambient temperature in an amount over 85% and having a Polydispersity Index ranging from 4.5 to 12; and
    3) 5-30% of a copolymer of ethylene with a $C_3$-$C_{10}$ α-olefin and optionally a diene, having an ethylene content ranging from 15 to 60% and an intrinsic viscosity value of at least 1 dl/g
    wherein components 1) and 2) have a stereoregularity of isotactic type.

2. The polyolefin composition according to claim 1 having a Flexural Modulus higher than 1000 MPa, an IZOD Impact Resistance at −20° C. ranging between 5 and 20 KJ/m² and a Burst Pressure Resistance higher than 1000 hours.

3. The polyolefin composition according to claim 1 wherein the component (1) fractionated by Solvent Gradient Elution Fractionation exhibits an hexene-1 content, in the fraction with an intrinsic viscosity equal to or higher than 3.3 dl/g, lower than the hexene-1 content in the fraction with an intrinsic viscosity of less than 3.3 dl/g.

4. The polyolefin composition according to claim 1 wherein said component (1) comprises a content of recurring units derived from hexene-1 ranging from 0.5 to 8% by weight.

5. The polyolefin composition according to claim 1 wherein the ratio of the intrinsic viscosity value of said propylene polymer 2) and that of said ethylene copolymer 3) ranges from 0.45 to 1.6.

6. Mono- or multilayer pipes wherein at least one layer comprises the polyolefin composition according to claim 1.

7. Pipe systems comprising a polyolefin composition comprising (percent by weight):
   1) 10-60% of a copolymer of propylene and hexene-1 wherein said copolymer comprises from 0.2 to 10% of recurring units derived from hexene-1, having a Polydispersity Index of 3 to 10; and
   2) 10-85% of a propylene polymer selected from a propylene homopolymer and a polymer of propylene with 0.1-10% of an α-olefin selected from ethylene, a $C_4$-$C_{10}$ α-olefin, hexene-1 excluded, and a mixture thereof, said propylene polymer being insoluble in xylene at ambient temperature in an amount over 85% and having a Polydispersity Index ranging from 4.5 to 12; and
   3) 5-30% of a copolymer of ethylene with a $C_3$-$C_{10}$ α-olefin and optionally a diene, having an ethylene content ranging from 15 to 60% and an intrinsic viscosity value of at least 1 dl/g.

* * * * *